(12) United States Patent
Oster et al.

(10) Patent No.: US 10,686,250 B1
(45) Date of Patent: Jun. 16, 2020

(54) CUP ANTENNA RADIO

(71) Applicant: Rockwell Collins, Inc., Cedar Rapids, IA (US)

(72) Inventors: Sasha N. Oster, Marion, IA (US); James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/032,850

(22) Filed: Jul. 11, 2018

(51) Int. Cl.
*H01Q 1/36* (2006.01)
*H01Q 1/24* (2006.01)
*H01Q 21/26* (2006.01)
*H01Q 1/38* (2006.01)
*H01Q 13/02* (2006.01)
*H04B 7/185* (2006.01)

(52) U.S. Cl.
CPC ............ *H01Q 1/362* (2013.01); *H01Q 1/246* (2013.01); *H01Q 1/38* (2013.01); *H01Q 13/0241* (2013.01); *H01Q 21/26* (2013.01); *H04B 7/18513* (2013.01)

(58) Field of Classification Search
CPC .......... H01Q 1/362; H01Q 1/246; H01Q 1/38; H01Q 21/26; H01Q 13/0241
USPC ........................................................ 343/789
See application file for complete search history.

(56) References Cited

U.S. PATENT DOCUMENTS

| | | | | |
|---|---|---|---|---|
| 4,012,744 A * | 3/1977 | Greiser | ..................... | H01Q 9/27 343/895 |
| 4,114,164 A * | 9/1978 | Greiser | ..................... | H01Q 9/27 343/895 |
| 5,909,196 A * | 6/1999 | O'Neill, Jr. | ............ | H01Q 1/242 343/853 |
| 5,920,292 A * | 7/1999 | O'Neill, Jr. | ............ | H01Q 1/242 343/702 |
| 7,292,203 B2 * | 11/2007 | Craggs | ................... | H01Q 1/288 343/895 |

OTHER PUBLICATIONS

Filipovic et al., "Broadband Meanderline Slot Spiral Antenna", IEE Proc.-Microw. Antennas Propag., vol. 149, 2, Apr. 2002. 8 pages.
Radway, Matthew, "Mode Theory of Multi-Armed Spiral Antennas and Its Application to Electronic Warfare Antennas", University of Colorado, Boulder, Jan. 1, 2011. 165 pages.

* cited by examiner

*Primary Examiner* — Huedung X Mancuso
(74) *Attorney, Agent, or Firm* — Donna P. Suchy

(57) ABSTRACT

A cup antenna radio includes a tubular dielectric medium having a hollow portion. The cup radio antenna also includes electronics located in the hollow portion, the electronics being configured for satellite communication. The cup radio antenna also includes a spiral element disposed on top of the tubular dielectric medium, and a helical element disposed on an outside sidewall of the tubular dielectric medium. The helical element includes a first member coupled to a first arm of the spiral element and a second member coupled to a second arm of the spiral element.

20 Claims, 4 Drawing Sheets

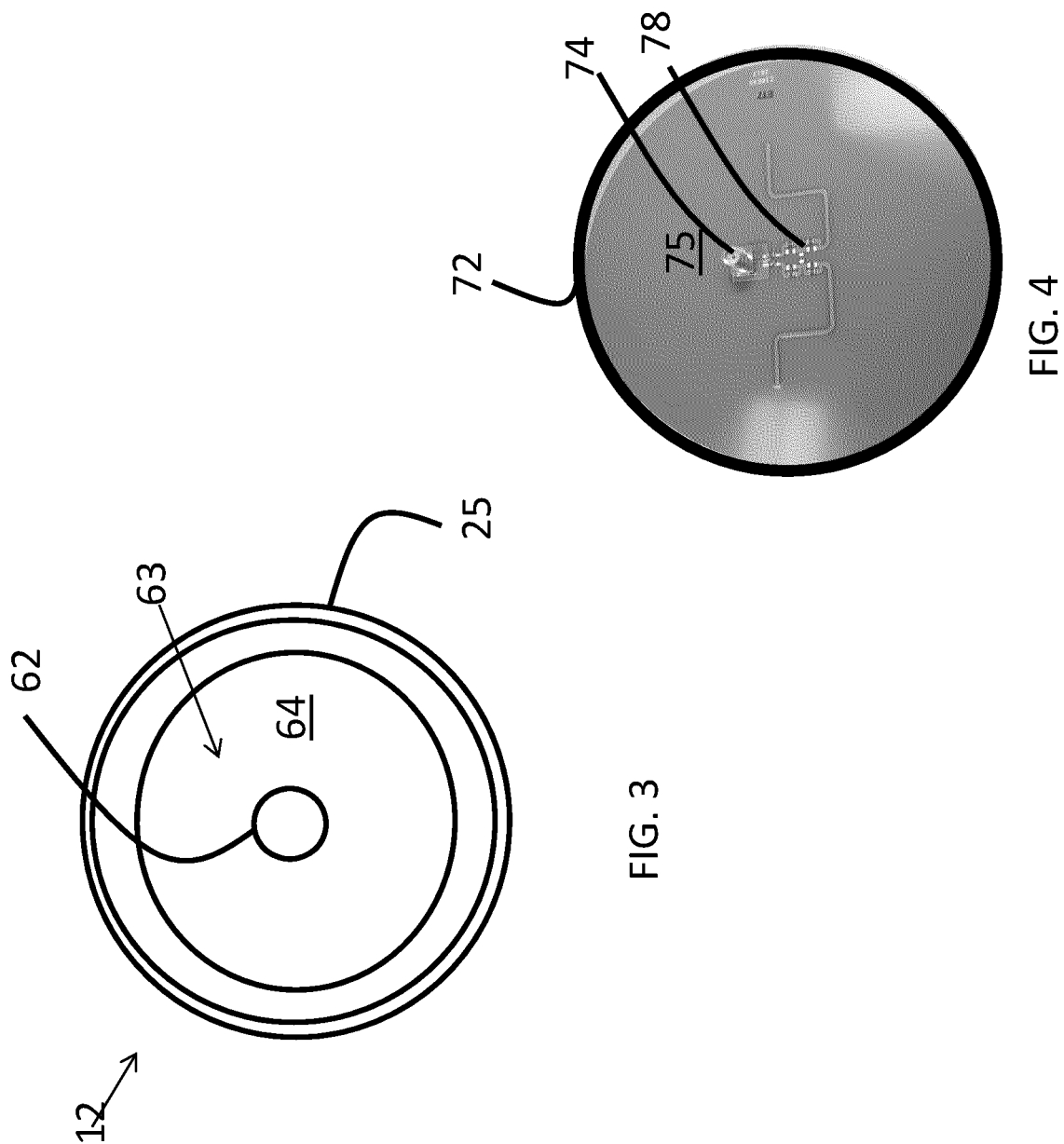

CUP ANTENNA RADIO

BACKGROUND

Embodiments of inventive concepts disclosed herein relate generally to radios including but not limited to small form factor radios for ultra high frequency (UHF) applications.

Modern sensing and communication systems may utilize various types of antennas to provide a variety of functions, such as communication, radar, and sensing functions. UHF antennas are useful for satellite communications and other communications. For example, the mobile user objective system (MUOS) is a narrowband satellite UHF communication system that supports worldwide multi-service users and provides net-centric voice and data communications. Conventional UHF antennas including conventional MUOS antennas are often large so that they can achieve high gain, directionality or high power capability.

SUMMARY

In one aspect, embodiments of the inventive concepts disclosed herein are directed to a cup antenna radio. The cup antenna radio includes a hollow cylinder or tubular dielectric medium having a hollow portion. The cup radio antenna also includes electronics located in the hollow portion, and the electronics are configured for UHF satellite communication. The cup radio antenna also includes a spiral element disposed on top of the tubular dielectric medium, and a helical element disposed on an outside sidewall of the tubular dielectric medium. The helical element includes a first member coupled to a first arm of the spiral element and a second member coupled to a second arm of the spiral element.

In a further aspect, embodiments of the inventive concepts disclosed herein are directed to an antenna. The antenna includes a spiral element including a first arm and a second arm, and a dielectric cylindrical or conical sidewall defining a hollow portion. The sidewall has a circular top edge, and the spiral element is disposed in a plane including the circular top edge. The antenna also includes a first conductive member disposed on the dielectric cylindrical or conical sidewall in a first helical fashion and coupled to the first arm, and a second conductive member disposed on the dielectric cylindrical or conical sidewall in a second helical fashion and coupled to the second arm. The first helical fashion is in a mirror arrangement with the second helical fashion. The antenna also includes a BALUN (Balanced to UnBalanced) circuit and a connector coupled to the spiral element and extending into the hollow portion from the plane including the circular top edge.

In a further aspect, embodiments of the inventive concepts disclosed herein are directed to a method of manufacturing a radio. The method includes providing a dielectric cup comprising a sidewall and a top surface. The sidewall and the top surface define a cavity, and the top surface includes an aperture. The method also includes providing a spiral antenna element on the top surface, providing a helical antenna element on the sidewall, and coupling transmitter/receiver electronics to the spiral antenna element through the aperture. The method also includes disposing the transmitter/receiver electronics in the cavity.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 3 is a bottom view schematic drawing of a cup dielectric substrate for the spiral helical cup antenna illustrated in FIG. 1 according to exemplary aspects of the inventive concepts disclosed herein;

FIG. 4 is a bottom perspective view schematic drawing of a top circuit board for the spiral helical cup antenna illustrated in FIG. 1 according to exemplary aspects of the inventive concepts disclosed herein;

DETAILED DESCRIPTION

Figures 1, 2:
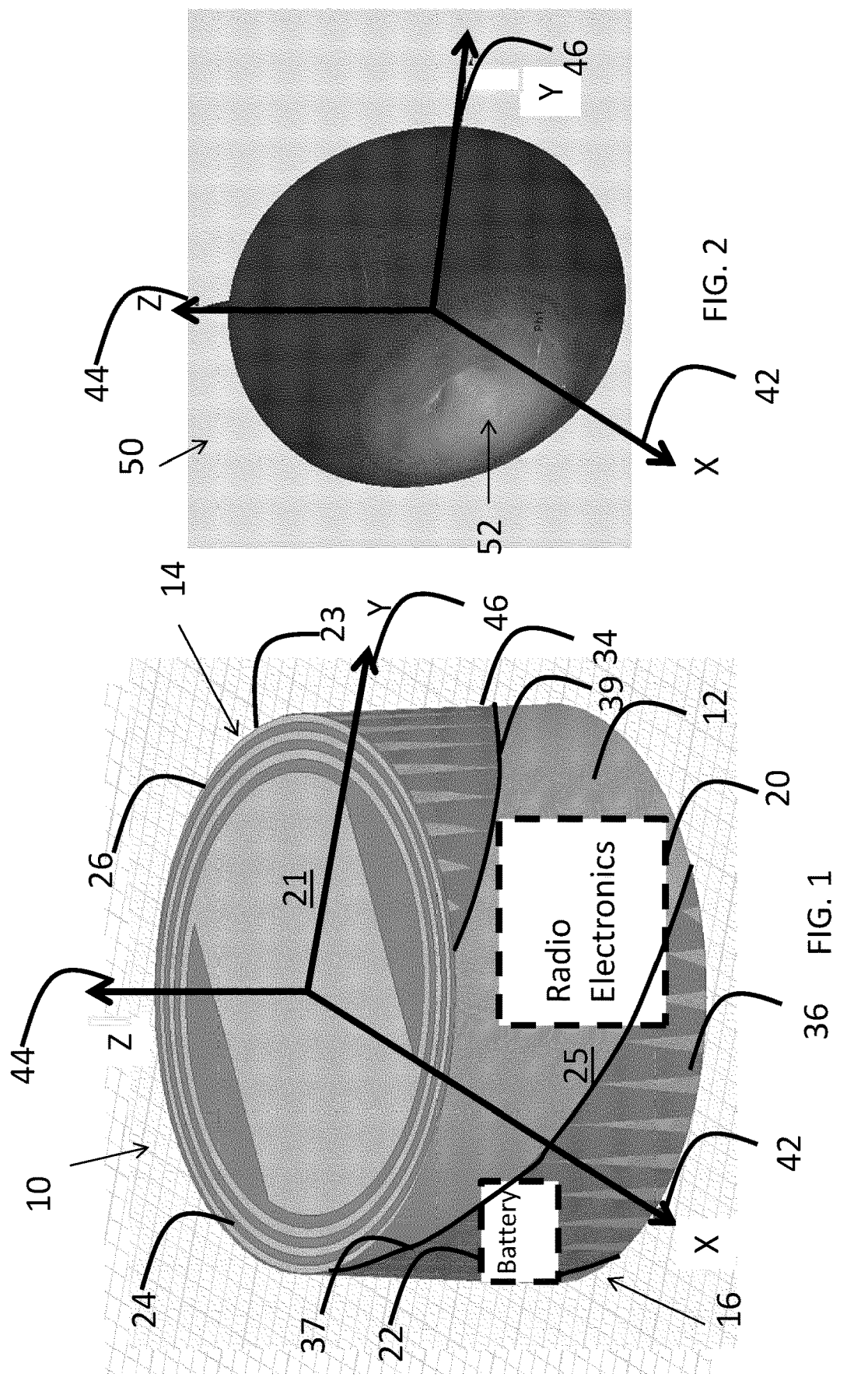
FIG. 1 is a schematic perspective view drawings of a radio including a spiral helical cup antenna according to exemplary aspects of the inventive concepts disclosed herein.
FIG. 2 is a schematic drawing of a radiation pattern for the radio including the spiral helical cup antenna illustrated in FIG. 1 according to exemplary aspects of the inventive concepts disclosed herein.

Before describing in detail embodiments of the inventive concepts disclosed herein, it should be observed that the inventive concepts disclosed herein include, but are not limited to a novel structural combination of components and circuits disclosed herein, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the diagrams provided in this disclosure, but should be construed in accordance with the language in the claims.

Some embodiments of the inventive concepts disclosed herein are directed to a spiral and helix antenna that is low cost, small form factor, lightweight and/or optimized for size, weight, cost, power and cost (SWAP-C). In some embodiments, systems and method provide a spiral and helix antenna that fits within a cylinder 12 centimeters (cm) in diameter and a 6 cm in height. In some embodiments, the systems and methods provide a spiral and helix cup antenna capable of circularly polarized (CP) operation in the 300-320 MegaHertz (MHz) and 360-380 MHz band. In some embodiments, a cup having tapered or non-tapered sidewalls has a hollow interior portion for housing device electronics, batteries, etc., while the top outside surface and the sidewalls house spiral and helical antenna elements. The antenna is configured for use in MUOS applications in some embodiments.

With reference to FIG. 1, a radio system 10 includes a cup substrate 12, a spiral antenna element 14, a helical antenna element 16, radio electronics 20, and a power source or battery 22. Radio electronics 20 and battery 22 and battery 22 are shown in block diagram form and can be provided in various physical packages are housed in a hollow portion or cavity defined by the cap substrate in some embodiments. In some embodiments, the radio electronics 20 and the battery 22 fit entirely within the cup substrate 12. The radio electronics 20 operates in the 300-320 MegaHertz (MHz) and 360-380 MHz band and includes receiver/transmitter circuitry including interfaces, up and down converters, modulators, demodulators, network layers, and processing circuits in some embodiments. The radio electronics 20 include receive and transmit circuitry for UHF operations and MUOS applications in some embodiments and are provided on one or more printed circuit cards attached within the cup substrate 12.

The cup substrate 12 houses the spiral antenna element 14 on a top surface 21. In some embodiments, the top surface 21 is planar and includes a circumferential edge 23 of the cup substrate 12. The circumferential edge 23 contacts a sidewall 25 of the cup substrate 12. The spiral antenna element 14 includes an arm 24 and an arm 26. The arms 24 and the arm 26 can be formed of thin metal conductive strips (e.g., copper, silver, gold, aluminum), such as, circuit board traces or conductive tape. The shape and arrangement of the arms 24 and 26 can vary depending upon design parameters and system requirements. The shape, number, and size of the arms 24 and 26 are shown in FIG. 1 in an exemplary fashion. For example, the width the arms 24 and 26, the radiuses associated with the curve of the arms 24 and 26, and a width between the arms 24 and 26 can be a various values depending upon antenna performance requirements.

The helical antenna element 16 includes a helical portion 36 coupled to the arm 26 and a helical portion 34 coupled to the arm 24. The helical portions 34 and 36 are formed of thin metal conductive strips (e.g., copper, silver, gold, aluminum), such as, circuit board traces or conductive tape. The arm 26 is coupled to a helical portion 36 and arm 24 is coupled to a helical portion 34 at the circumferential edge 23 of the top surface 21 associated with the cup substrate 12. The arm 26 is coupled to a helical portion 36 and arm 24 is coupled to a helical portion 34 using solder or conductive paste in some embodiments. The top surface 21 is part of a circuit board or is part of the cup substrate 12 in some embodiments. In some embodiments, the conductive lines for the arms 24 and 26 are provided directly on the cup substrate on the top surface 21, and the conductive regions for the helical tabs or helical portions 34 and 36 are provided directly on the sidewall 25. The helical portions 34 and 36 have a triangular or parallelogram shape in some embodiments.

The helical portions 34 and 36 are arranged opposite or mirrored from each other or in a barber pole configuration ins some embodiments. The shape and arrangement of the helical portions 34 and 36 can vary depending upon design parameters and system requirements. The shape, number, and size of the helical portions 34 and 36 are shown in FIG. 1 in an exemplary fashion. For example, the width of the helical portions 34 and 36, the angles of sides 37 and 39 of the helical portions 34 and 36, and a width between the helical portions 34 and 36 can be a various values depending upon antenna performance requirements. The helical portions 34 and 36 can have a comb-like shape, have finger shape (e.g., fingers pointing up or down), or are non-digitated (e.g., solid plane) conductors in some embodiments. The helical arms or portions 34 and 36 can be reactively loaded by meandering metallic traces, to be electrically longer, or reactively loaded with lumped components (inductors and capacitors) for further miniaturization for given operational frequencies.

In some embodiments, the cup substrate 12 is a hollow cylinder. The hollow cylinder can have a square, circular, rectangular, pentagonal, hexagonal or other cross section in some embodiments. The sidewall 25 of the hollow cylinder can be tapered several degrees from a 90 degree angle with respect to the top surface 21 in some embodiments. In some embodiments, the sidewall is 5 millimeters thick. The cup substrate 12 is provided with respect to an X-axis 42, a Z-axis 44 and a Y-axis 46. The cup substrate 12 is a dielectric material (e.g., paper, polytetrafluoroethylene (PTFE), acrylonitrile butadiene styrene (ABS), or plastic. The cup substrate 12 fits within 12 cm diameter by 6 cm tall cylinder in some embodiments.

With respect to FIG. 2, the radiation response of the combination of the spiral antenna element 14 and helical antenna element 16 is shown by representation 50 where darker areas represent greater energy. Representation 50 has a donut shape and has a null at location 52 in the Y-axis direction. Advantageously, the radio system 10 has radiation in the direction of the Z-axis 44 for communication with satellites as the cup substrate 12 is placed on the ground or other location with its bottom on the ground or displaced from the ground (e.g., displaced 12 centimeters from the ground sitting on a canister). In some embodiments, wideband performance is traded for form factor optimization to operate in the UHF band. For a fixed diameter, the use of the helical antenna element 16 provides improvement in voltage standing wave ration over a planar spiral antenna design.

With reference to FIG. 1, the dielectric material for the cup substrate 12 is chosen for appropriate gain characteristics for the antenna of the radio system 10 in some embodiments. For example, ABS material can provide a right hand circularly polarized (RHCP) at desired frequency is −4.91 decibels isotropic (dBi). PTFE material which has a lower dielectric constant and lower loss tangent increases the RHCP gain at desired frequency −3 dBi resulting in 1 dB gain in some embodiments. The cup substrate 12 is manufactured in a three-dimensional (3D) printing technique or by machining in some embodiments. In some embodiments, static and/or tunable material loading (e.g. dielectric-ferromagnetic materials and ferromagnetic-(ferrite) material impregnated in the antenna substrate) as a part of the 3D dative manufacturing process advantageously adds further minimization and frequency tunablility.

In some embodiments, the construction of the 3D antenna for the radio system 10 is accomplished with standard 2 dimensional PCB fabrication techniques including fabrication of a standard PCB and a flex PCB. A flexible PC board containing the helical portions 34 and 36 or two flexible PC boards each including one of the helical portions 34 and 36 can be wrapped around the sidewall 25, and a rigid or flexible circuit board (e.g., the circuit board 72 in FIG. 4) is used for the spiral antenna element 14. In some embodiments, co-printing of dielectric and conductive material is used to form the helical portions 34 and 36, spiral antenna element 14 and the cup substrate 12 (e.g. using a Voxel 8 machine). In some embodiments, the dielectric constant of the material supporting the spiral antenna element 14 (e.g., the circuit board 72) is different from the dielectric material supporting the helical portions 34 and 36 (e.g., the sidewall 25). In some embodiments, a rigid portion of a circuit board is used for the spiral antenna element 14 and a flex portion of the same circuit board is used for the helical portions 34 and 36. A hybrid manufacturing process can be used to for the rigid/flex circuit board.

With reference to FIG. 3, the cup substrate 12 includes a cavity 63 for the radio electronics 20 and the battery 22 defined by the sidewall 25 and an underside surface 64 of the top surface 21 (FIG. 1). An aperture 62 is provided for connection of the radio electronics 20 to the spiral antenna element 14. With reference to FIG. 4, a circuit board 72 houses the spiral antenna element 14 on a top surface and a connector 74 on a bottom surface 75. The bottom surface 75 can include switchable or controllable capacitors 78 for matching operations. The connector 74 is provided through the aperture 62. The connector 74 is a BALUN connector in some embodiments. The performance is optimized when fed with a BALUN connector and an impedance matching network is utilized. A ground plane can be added to allow for more directional radiation (e.g. uni-directional/upper-hemisphere radiation). In some embodiments, the ground plane can be cupped to make the antenna more directive and redirect energy away from ground (i.e. the Earth). The diameter, slope and length of the cupped section are used to shape the radiation pattern. In addition, a high impedance surface (HIS) and an artificial magnetic conductor (AMC) is used for a narrow band application to shape the radiation pattern away from the Earth in some embodiments. In some embodiments, the AMC helps to isolate the parasitic effects of the Earth on the radiation pattern for terrestrial sensors setting on the Earth, foliage, cement, pavement, sand, etc. The connector 74 is implemented with a discrete active or passive (electronic circuit rendition) BALUN, lumped element, or active element in some embodiments.

The circuit board 72 can be the top surface 21 of the cup substrate 12 or adhered to the top surface 21 of the cup substrate 12 in some embodiments. The circuit board 72 is a rigid or flexible printed circuit board (PCB) (e.g., FR1, CEM-1, Teflon, FR5, etc.) in some embodiments. The circuit board 72 is circular in some embodiments and other shapes can be utilized. The circuit board 72 is multilayered in some embodiments.

Figure 5:
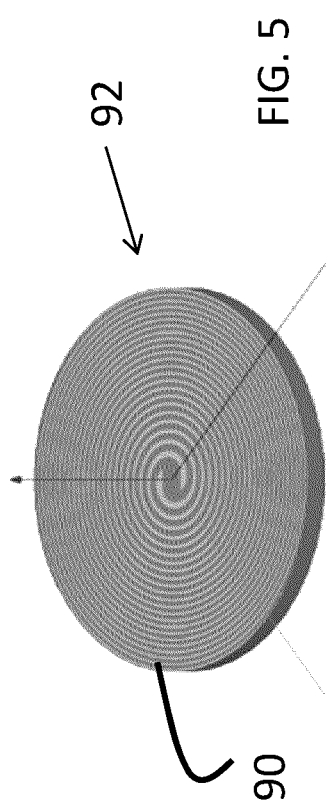
FIG. 5 is a top perspective view schematic drawing of a top circuit board for the spiral helical cup antenna illustrated in FIG. 1 according to exemplary aspects of the inventive concepts disclosed herein.

With reference to FIG. 5, a circuit board 92 is used with cup substrate 12 instead of the circuit board 72. The circuit board 92 includes a spiral pattern 90 with a different spiral pattern than the pattern for the spiral antenna element 14 shown in FIG. 1. The spiral pattern 90 can be a two arm, 4 arm, or other arm spiral pattern depending upon design criteria. The circuit board 92 can be an FR4 or other suitable dielectric material including conductive traces configured in a variety of shapes to provide the spiral pattern 90. In some embodiments, the spiral pattern 90 includes 20 to 40 turns and has a tighter configuration than the spiral antenna element 14 (FIG. 1).

Figure 6:
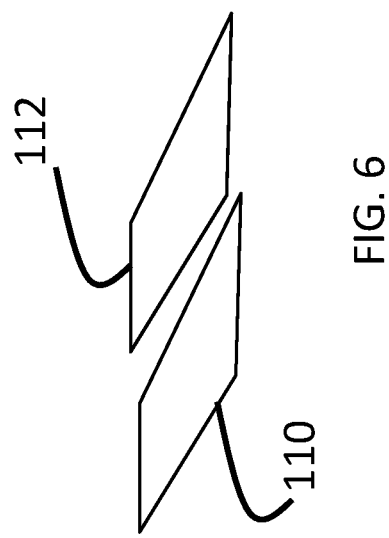
FIG. 6 is a perspective view schematic drawing of two helical antenna elements for the spiral helical cup antenna illustrated in FIG. 1 according to exemplary aspects of the inventive concepts disclosed herein.

With reference to FIG. 6, tape portions 110 and 112 can be utilized to provide the helical portions 34 and 36 on the sidewall 25 of the cup substrate 12. The tape portions 110 and 112 can be applied as mirror arrangements from each other in some embodiments. In some embodiments, the portions 110 and 112 are copper tape.

Figure 7:
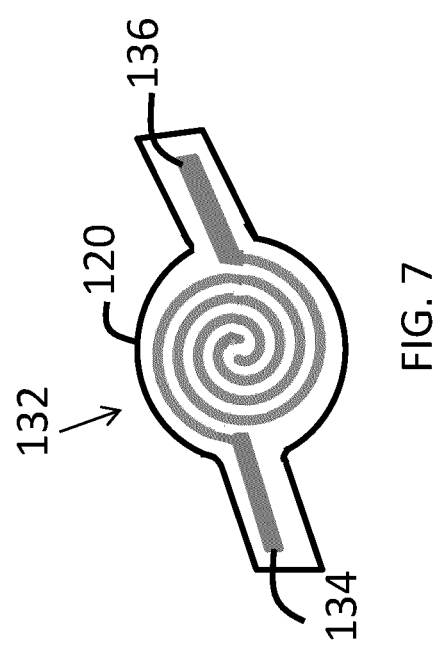
FIG. 7 is a top view schematic drawing of a flex circuit board for the spiral helical cup antenna illustrated in FIG. 1 according to exemplary aspects of the inventive concepts disclosed herein.

With respect to FIG. 7, a flexible circuit board 120 can be utilized to provide the spiral antenna element 14 and the helical antenna element 16 (FIG. 1). The flexible circuit board 120 is a polyimide or other polymer material in some embodiments. The flexible circuit board 120 can include a spiral pattern 132 and helical portions 134 and 136 embodied as thin printed circuit board traces. The helical portions 134 and 136 can be bent around the circumferential edge 23 of the top surface 21 and glued or adhered to the sidewall 25 (FIG. 1). Advantageously, the flexible circuit board 120 provides a one-piece unit for forming the spiral and helical antenna elements 14 and 16.

Various antenna types can be realized utilizing the spiral and helical patterns provided on the cup substrate 12. For example, different number of spiral arms and dimensions of spiral arms can be utilized. Different dimensions can be utilized for different operational frequencies. For example, the spiral circumference, spaces between spiral arms, lengths of spiral arms, radius of curvature associated with spiral arms can be chosen for specific system criteria and design parameters. In addition, the wall thickness (e.g., thickness of the sidewall 25) associated with the cup substrate 12 can vary, and different materials for the dielectric material can be utilized. In some embodiments, the cup substrate 12 is a plastic, phenolic, or other material suitable for antenna structures. The cup substrate 12 can be mounted at a set distance from a ground plane in accordance with design criteria. In some embodiments, a digital voltage control capacitor (e.g., varactor diodes, MEMs-based capacitors, transistor junctions, etc.) can be used in a matching circuit to achieve a match at different frequencies. The cup substrate 12 can be formed with standard PCB materials or flex PCB materials in some embodiments. The cup geometry can be machined or 3D printed in some embodiments. In some embodiments, a rigid PCB board is mounted on the top of the dielectric of the cup substrate and a flexible PCB board is wrapped around the side of the cup substrate 12. In some embodiments, the interior of the cup substrate 12 is aligned with a HIS to realize electromagnetic interference (EMI) immunity between the active RF analog and digital cards inside the cup substrate 12 and the radiating antenna structure outside the cup substrate 12. In some embodiments, a co-printing of dielectric and conductive material such as by a Voxel8 machine can be utilized to form the cup substrate 12 and the spiral and helical elements 14 and 16.

The radio system 10 is manufactured by the providing a spiral antenna element 14 on the top surface 21 and providing the helical antenna element 16 on the sidewall 25 using any of the techniques described above. The radio electronics 20 are coupled to the spiral antenna element 14 through the aperture 62 using the connector 74 and securing the radio electronics 20 and the battery 22 in the cavity 63. In some embodiments, the conductive material associate with the spiral antenna element 14 and the helical antenna element 16 are coated with a finish layer for protection and corrosion resistance.

In some embodiments, the antenna structure associated with the cup substrate 12 is scaled for very high frequency through millimeter wave applications. In some embodiments, the radio system 10 is configured as a mobile hotspot or local area network node (e.g., for ad hoc networking). In some embodiments, the radio system 10 is configured for use in a targeted covert signal intelligence (SIGINT) ad hoc network to create a wireless LAN with attritable cup radio sensors. In some embodiments, the radio system 10 provides a self-destructive, attritable sensor where the cup substrate 12 is fabricated from combustible, explosive, or environmentally degradable materials, where the proof of existence of the sensor/radio system 10 is undesirable. In some embodiments, the radio system 10 is configured as a targeted attritable stand in jamming device.

In some embodiments, the center of gravity (Cg) and moment arm of the mechanical assembly of the radio system 10 (along with a non-uniform mass distribution) is configured so that during free-fall deployment, the radio system 10 self-aligns (e.g., for aircraft driven, cannon fired or terrestrial vehicle/dismount foot solder hand tossed deployments) to ensure the proper antenna orientation for optimal polarization match, link margin, etc.

The construction and arrangement of the systems and methods as shown in the various exemplary embodiments are illustrative only. Other numbers or types of antenna elements, other polarization configurations and other numbers or types dipole elements can be used. Although only a number of embodiments have been described in detail in this disclosure, many modifications are possible (e.g., variations in sizes, dimensions, structures, shapes and proportions of the various elements, values of parameters, orientations, etc.). For example, the position of elements may be reversed, flipped, or otherwise varied and the nature or number of discrete elements or positions may be altered or varied. Accordingly, all such modifications are included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the scope of the inventive concepts disclosed herein.

What is claimed is:

1. A cup antenna radio, comprising:
   a tubular dielectric medium having a hollow portion;
   a receiver comprising electronics located in the hollow portion, the electronics being configured for UHF satellite communication;
   a spiral element comprising a first arm and a second arm disposed on top of the tubular dielectric medium; and
   a helical element disposed on an outside sidewall of the tubular dielectric medium and comprising a first member coupled to the first arm and a second member coupled to the second arm.

2. The radio of claim 1, wherein the first member is coupled to the first arm at a circumferential edge of the top of the tubular dielectric medium and the second member is coupled to the second arm at the circumferential edge of the top of the tubular dielectric medium, wherein the first arm between 20 and 30 turns.

3. The radio of claim 1, wherein the tubular dielectric medium has a circular cross section.

4. The radio of claim 1, wherein the outside sidewall is tapered.

5. The radio of claim 1, wherein the outside sidewall is non-tapered.

6. The radio of claim 1, wherein the spiral element comprises four arms.

7. The radio of claim 1, wherein the spiral element and the helical element are provided on a one-piece flexible circuit board.

8. The radio of claim 1, wherein the spiral element is provided on a rigid circuit board.

9. The radio of claim 1, wherein the radio has a volume contained in a 12 cm diameter by 6 cm tall cylinder.

10. An antenna, comprising:
    a spiral element comprising a first arm and a second arm disposed on a top side of a circular planar element;
    a dielectric cylindrical or conical sidewall defining a hollow portion, the sidewall having a circular top edge, wherein the spiral element is disposed in a plane comprising the circular top edge;
    a first conductive member disposed on the dielectric cylindrical or conical sidewall in a first helical fashion and coupled to the first arm;
    a second conductive member disposed on the dielectric cylindrical or conical sidewall in a second helical fashion and coupled to the second arm, the first helical fashion being in a mirror arrangement with the second helical fashion; and
    a connector releasably coupled to the spiral element and extending from a bottom side of the circular planar element into the hollow portion from the plane comprising the circular top edge.

11. The antenna of claim 10, wherein the dielectric cylindrical or conical sidewall is polytetrafluoroethylene (PTFE).

12. The antenna of claim 10, wherein the spiral element is on a top surface of a circuit board and the connector is on a bottom surface of the circuit board.

13. The antenna of claim 10, wherein the dielectric cylindrical or conical sidewall is acrylonitrile butadiene styrene (ABS).

14. The antenna of claim 13, wherein the spiral element, the first conductive member, the second conductive member, and the connector are attached to a single circuit board.

15. A method of manufacturing a radio, the method comprising:
    providing a dielectric cup comprising a sidewall and a top surface, the sidewall and the top surface defining a cavity, the top surface comprising an aperture;
    providing a spiral antenna element on the top surface;
    providing a helical antenna element on the sidewall;
    coupling transmitter/receiver electronics to the spiral antenna element through the aperture; and
    disposing the transmitter/receiver electronics in the cavity.

16. The method of claim 15, wherein the radio is a mobile user objective system ultra high frequency radio.

17. The method of claim 16, wherein the transmitter/receiver electronics are coupled to the spiral antenna element using a BALUN circuit and connector disposed on a circuit board comprising the spiral antenna element.

18. The method of claim 17, further comprising:
    providing controlled capacitors for matching on the circuit board.

19. The method of claim 17, further comprising:
    coupling a first tab of the helical antenna element to a first arm of the spiral antenna element; and
    coupling a second tab of the helical antenna element to a second arm of the spiral antenna element.

20. The method of claim 19, wherein the first tab is a conductive tape.

* * * * *